(12) United States Patent
Mo et al.

(10) Patent No.: US 9,710,545 B2
(45) Date of Patent: Jul. 18, 2017

(54) METHOD AND APPARATUS FOR CONDUCTING CONTEXT SENSITIVE SEARCH WITH INTELLIGENT USER INTERACTION FROM WITHIN A MEDIA EXPERIENCE

(71) Applicant: Intel Corporation, Santa Clara, CA (US)

(72) Inventors: Stanley Mo, Portland, OR (US); Victor Szilagyi, London (GB); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 13/722,274

(22) Filed: Dec. 20, 2012

(65) Prior Publication Data
US 2014/0180672 A1   Jun. 26, 2014

(51) Int. Cl.
  *G06F 17/27* (2006.01)
  *G06F 17/30* (2006.01)

(52) U.S. Cl.
  CPC .............. *G06F 17/30684* (2013.01)

(58) Field of Classification Search
  USPC ........................................ 704/1, 9, 10, 257
  See application file for complete search history.

(56) References Cited

U.S. PATENT DOCUMENTS 5,933,822 A * 8/1999 Braden-Harder et al.
6,236,768 B1 * 5/2001 Rhodes et al. ............... 382/306
6,249,784 B1 * 6/2001 Macke et al.
6,546,388 B1 * 4/2003 Edlund et al.
(Continued)

FOREIGN PATENT DOCUMENTS

JP      2002-259424 A    9/2002
KR   10-2009-0087269 A   8/2009
(Continued)

OTHER PUBLICATIONS

International Search Report and Written Opinion received for International application No. PCT/US2013/075848, mailed on Mar. 26, 2014, 14 pages.
(Continued)

*Primary Examiner* — Jesse Pullias
(74) *Attorney, Agent, or Firm* — Jordan IP Law, LLC (57) ABSTRACT

In some embodiments, the invention involves context based search engine using a user selected term within a media experience. A natural language processor module is configured to provide context based keywords related to the search term and from within the media experience. In some embodiments, a proximity based statistical analysis is used to derive the keywords. The keywords are provided to at least one content browser or other search engine(s) to effect the search. In some embodiments, a machine learning module is communicatively coupled to the natural language processer to further refine the context for selecting relevant keywords. The context search engine, natural language processor module, machine learning module and search engine may reside on the same computing device or be distributed among a variety of local, remote and cloud devices for processing. Other embodiments are described and claimed.

23 Claims, 5 Drawing Sheets

(56) References Cited

U.S. PATENT DOCUMENTS

| | | | |
|---|---|---|---|
| 6,968,333 B2* | 11/2005 | Abbott et al. | |
| 7,644,072 B2* | 1/2010 | Budzik et al. | 707/748 |
| 2003/0005461 A1 | 1/2003 | Shinohara | |
| 2004/0194141 A1* | 9/2004 | Sanders | 725/53 |
| 2005/0193335 A1* | 9/2005 | Dorai | G06F 17/30893 715/234 |
| 2006/0053154 A1 | 3/2006 | Yano | |
| 2006/0277271 A1* | 12/2006 | Morse | H04L 67/26 709/217 |
| 2007/0055652 A1 | 3/2007 | Hood et al. | |
| 2007/0061332 A1* | 3/2007 | Ramer | G06Q 30/0241 |
| 2008/0040330 A1 | 2/2008 | Yano | |
| 2009/0132969 A1 | 5/2009 | Mayer | |

FOREIGN PATENT DOCUMENTS

| | | | |
|---|---|---|---|
| KR | 10-2010-0115413 A | 10/2010 | |
| WO | 01/31479 A1 | 5/2001 | |
| WO | 2005070019 A2 | 8/2005 | |

OTHER PUBLICATIONS

Cathal Gurrin, et al. "iForgot, A Model of Forgetting Robotic Memories", IEEE, 2010, 2 pages.

Geoffrey R. Loftus, et al. "Learning-Forgetting Independence, Unidimensional Memory Models, and Feature Models: Comment on Bogartz", Journal of Experimental Psychology: Learning, Memory, and Cognition, vol. 16, No. 5, American Psychological Association, Inc., 1990, pp. 916-926.

Janusz A. Starzyk, et al. "Spatio-Temporal Memories for Machine Learning: A Long-Term Memory Organization", IEEE Transactions on Neural Networks, vol. 20, No. 5, May 2009, 13 pages.

Qingping Wang, et al. "Towards Applying Machine Learning to Adaptive Transactional Memory", Lehigh University and Unversity of Delaware, May 16, 2011, 9 pages.

Extended European Search Report for European Patent Application No. 13866022.0, mailed Jul. 14, 2016, 7 pages, European Patent Office.

* cited by examiner

METHOD AND APPARATUS FOR CONDUCTING CONTEXT SENSITIVE SEARCH WITH INTELLIGENT USER INTERACTION FROM WITHIN A MEDIA EXPERIENCE

TECHNICAL FIELD

The present disclosure relates generally to the field of term searches in digital media and, more specifically, to using contextual information surrounding a search term within a media experience to provide for better results. Initiation of a search is simplified by enabling a user to select a search term which is then to be automatically qualified by surrounding context.

BACKGROUND

Search systems today operate with the user providing a specific question in order to seek out the "right" answer. Often the user is not sure whether the question is appropriately phrased to provide the desired results, or sometimes not quite sure what to ask. As a result of user uncertainty regarding the algorithms used in an online search, or lack of understanding of the topic in question, repeated searches and rephrasing of the search terms or question are often necessary to provide the user with the relevant and desired results. Existing systems may use the term or phrase entered as search criteria and form a variety of Boolean searches or use other algorithms, and may provide results based on what other people found relevant in similar searches; there is no knowledge or understanding of why the user entered that particular search term based on any useful context.

BRIEF DESCRIPTION OF THE DRAWINGS

The features and advantages of embodiments disclosed herein will become readily understood by the following Detailed Description, in conjunction with the accompanying drawings. Like numerals having different letter suffixes may represent different instances of similar components. The drawings illustrate generally, by way of example, but not by way of limitation, various embodiments discussed in the present document.

DETAILED DESCRIPTION

In the following Detailed Description, reference is made to the accompanying drawings which form a part of the Detailed Description, wherein like numerals designate like parts throughout, and in which is shown by way of illustration embodiments that may be practiced. These embodiments may also be referred to herein as "examples." Such examples may include elements in addition to those shown or described. However, the authors also contemplate examples in which only those elements shown or described are provided. Moreover, the authors also contemplate examples using any combination or permutation of those elements shown or described (or one or more aspects thereof), either with respect to a particular example (or one or more aspects thereof), or with respect to other examples (or one or more aspects thereof) shown or described herein.

It is to be understood that other embodiments or examples may be utilized and structural or logical changes may be made without departing from the scope of the present disclosure. Therefore, the following Detailed Description is not to be taken in a limiting sense, and the scope of embodiments is defined by the appended claims and their equivalents.

An embodiment is a system and method relating to contextual search using terms selected by a user during a media experience. In at least one embodiment, an embodiment is intended to enable a user to select a simple term or phrase appearing in the media experience. A search engine utilizes context surrounding the selected term, from the media experience, to better focus the search, and provides contextual based search results to the user. The media experience may be a web browsing session, reading of an electronic book (ebook), viewing a television, broadcast, or media stream, in-vehicle infotainment, reading electronic mail (e-mail) or other digital document, or other user interaction with digital or electronic media.

Reference in the specification to "one embodiment," "an embodiment" or "an example" means that a particular feature, structure or characteristic described in connection with the embodiment or example is included in at least one embodiment as described herein. Thus, the appearances of the phrase "in one embodiment" appearing in various places throughout the specification are not necessarily all referring to the same embodiment.

For purposes of explanation, specific configurations and details are set forth in order to provide a thorough understanding of the embodiments disclosed herein. However, it will be apparent to one of ordinary skill in the art that embodiments may be practiced without the specific details presented herein. Furthermore, well-known features may be omitted or simplified in order not to obscure understanding of the description herein. Various examples may be given throughout this description. These are merely descriptions of specific embodiments. The scope of the claims is not limited to the exact examples given.

Figure 1:
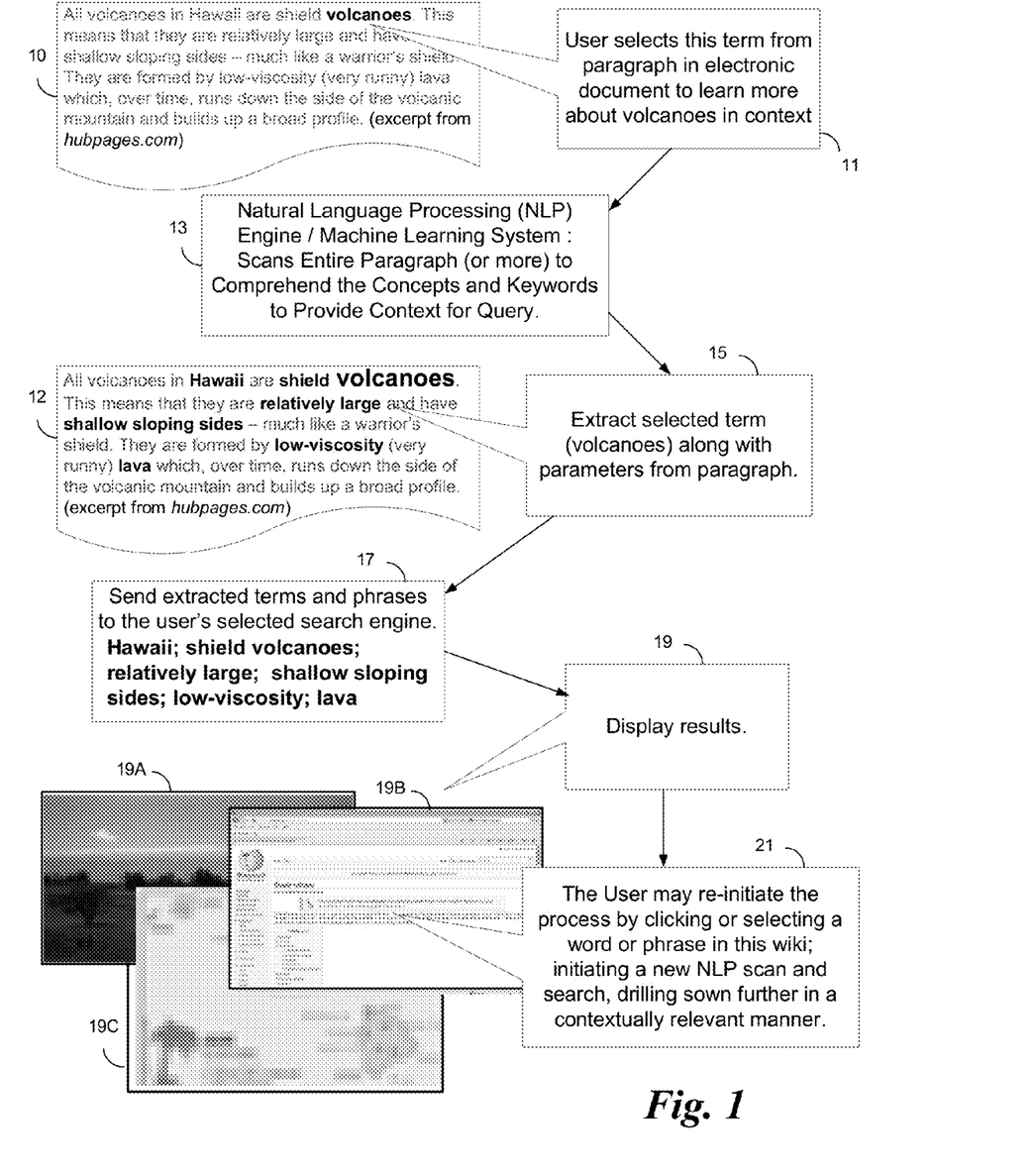
FIG. 1 is a modified flow diagram illustrating a method for selecting a search term and using media context to provide search results, according to an embodiment.

FIG. 1 is a flow diagram illustrating a method for selecting a search term and using media context to provide search results, according to an embodiment. The figure is somewhat modified to include both an example method, as well as example data and results. In an illustrative example, a user may be reading a document or web page providing information about volcanoes in Hawaii. For illustration purposes only, the authors have used an excerpt from a web page at hubpages.com. The excerpt is shown as data block 10. The user desires to learn more about volcanoes, in the context of the article being read. In block 11, the user selects the term "volcanoes" from the electronic document. It will be apparent that various methods may be used to effect this selection. For instance, on a computing device with a mouse device, the user may use the mouse to select the term. On a touch screen device such as a tablet, Ultrabook™ device, hybrid device, smartphone, vehicle navigation or in-vehicle infotainment system, etc., the user may touch and hold the search term until it is highlighted. An embodiment where the selection is a television program will be discussed later.

Other types of selecting are contemplated and may vary based on the device type and its recognition of input.

A natural language processing (NLP) module scans a selected portion of the electronic document in block 13 to comprehend the concepts and relevant keywords surrounding the selected search term. The selected portion may vary from a single sentence, single paragraph, multiple sentences, multiple paragraphs, or the entire document, etc. The size of the selected portion may be pre-selected as a default by the system, or be user defined, or depend on the size of the document (e.g., a percent of total text), or by page. Pre-selected defaults may be varied over time by the NLP module using various proximity based statistical analysis. The size of the portion may also be dynamically selected partially based on relative processing speed of the device performing the NLP, in order to provide results to the user without significant delay. Tradeoffs between an optimal portion size and acceptable delays may be performed. An acceptable delay may be pre-defined and an estimate of processing time for various sizes of portions may be used to help select the maximum portion size allowable to provide timely response. The portion size may change for different excerpt sizes by starting with a default size (or proximity to the selected text) and using machine learning techniques and statistical modeling with the NLP to adjust the size for better identification of important keywords.

There are many known techniques for performing natural language processing on words, phrases and other portions of text. Embodiments described herein may use a combination of named entity recognition (NER) and Bayesian statistical models.

For instance, named entity recognition techniques may help identify a correlation between pronouns and the appropriate subject in a sentence, or string of sentences. NER is meant to locate and classify atomic elements in text into predefined categories such as the names of persons, organizations, locations, expressions of times, quantities, monetary values, percentages, etc. Existing NER systems may use linguistic grammar-based techniques as well as statistical models. Statistical NER systems typically require a large amount of manually annotated training data. Embodiments described herein may use a machine learning model to tune the results of the NLP.

Bayesian statistical models are generally well known in the art. Bayesian statistics expresses evidence about the true state of the world in terms of degrees of belief or, more specifically, Bayesian probabilities. Such an interpretation is only one of a number of interpretations of probability and there are many other statistical techniques that are not based on "degrees of belief". Embodiments described herein may use a variation of traditional Bayesian statistical models by including locality and proximity based algorithms to focus on the context of a concept or idea within the portion text, but along a longer spectrum of text than traditionally used in NLP algorithms. Bayesian modeling over longer portions of text helps identify important terms and unimportant terms within the text portion. In embodiments, modeling algorithms use the assumption that the farther from the selected search term you are, the less relevant to the core concept that term is, i.e., the term would have a lower weight in the analysis and identification of relevant keywords. Thus, this proximity based statistical analysis may provide better resulting relevant keywords for entry into a search engine.

Data block 10 illustrates an example portion of an electronic document to analyze for context. Block 12 shows the portion with identified keywords in bold. It should be noted that a keyword may be a term or phrase and is not limited to a single word. In this example, using the portion shown in block 10, the NLP extracts the selected term, "volcanoes" and a number of other keywords or parameters. In this example, the NLP module identifies the following keywords to be used as parameters in the contextual search: Hawaii; shield volcanoes; relatively large; shallow sloping sides; low-viscosity; and lava. The selected search term along with contextual keywords, or parameters, are extracted for use in a search engine in block 15. The extracted terms and keywords, or phrases (parameters) are then sent to the user's preferred or default search engine in block 17. It should be noted that any common search engine may be used, as the contextual keywords are sent to the selected search engine to focus the search based on context of the original document. A custom search engine may be used, if desired. It will be understood that the search engine may be located on a remote network server, a cloud service provider server, provided on an intermediary server, or be local to the user's device. Location of the search engine may depend on the type of search, e.g., a local or remote database search, local document search, Internet search, etc.

The search engine uses the search term and contextual keywords or phrases and performs a search (not shown). The results are returned to the user, based on operation of the search engine, and displayed in block 19. Results 19A-C, for instance, may be displayed on the user device, or secondary user device, to be described more fully below. In this example, Results may comprise a photo of Hawaii 19A, a Wikipedia page 19B, and/or a map of Hawaii 19C. Results may be displayed as hyperlinks with or without preview text, simple text, spoken text, images, one or more browser pages, one or more popup dialog boxes, or any form visible or audible to the user. The form of the results may depend on how the contextual search system is integrated with the media experience.

For instance, the contextual search system may be implemented as a browser add-on, part of a dynamic load library (DLL), integrated as a module within a media experience system or other method. In an embodiment, the contextual search component is part of the original media experience but designed into it to provide an optimal user interaction model. For instance, an eBook may utilize a plug-in for a Web application, or a DLL for a local application. The actual contextual search may be limited to simple highlights of key words when they are selected (pressed) and an overlay may popup with the results or the entire page may roll back to reveal an under page with the pushed results. If the contextual search system is integrated as an add-on where the search term and keywords are simply passed to a default search engine, the results may be displayed in a manner conforming to the selected search engine's usual method of display. In some cases, the search engine results may be passed back to the contextual search system and then reformatted for a different method of display, as desired. The default manner of display may vary based on a user's pre-selected profile or device configuration. For instance, the display may be different based on the size of the viewable area on the user device.

Figure 2:
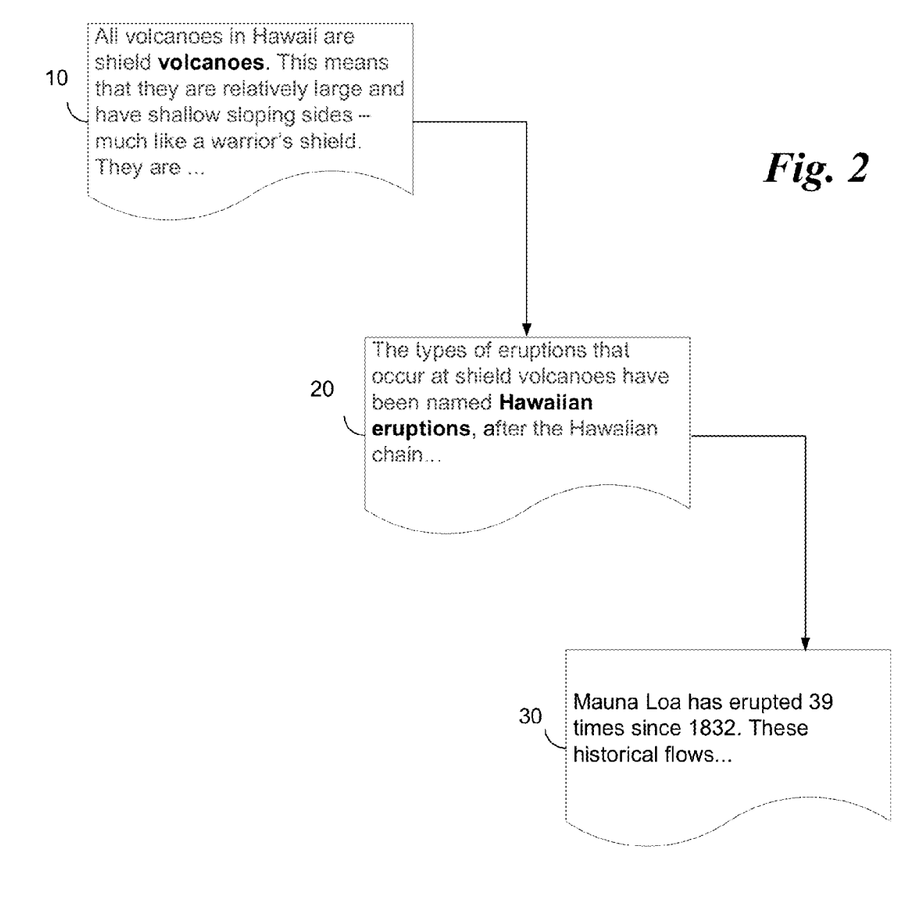
FIG. 2 illustrates a progressive search, according to an embodiment.

When results are displayed as another electronic document, such as a browser page showing a wiki entry 19B, the user may reinitiate another contextual search by selecting a new word or phrase, as in block 21, and initiating another NLP scan (block 13). FIG. 2 illustrates an example progressive search. In an embodiment, this next search may be a completely new search, where the scan for keywords basically starts from scratch, or the next search may use keywords or historical, or residual, contextual information identified from the previous search(es) to help refine the context and provide focused keywords during the next NLP scan (13). For instance, by selecting a keyword from keywords identified in the previous scan, the NLP module may weight other terms as less important, as they were not selected for this next search, thereby changing the context focus.

In FIG. 2, block 10 shows the original data portion (excerpt) used for the initial search, as described above, with "volcanoes" as the selected search term. An example excerpt of a result of this contextual search is illustrated in block 20. In this example, the user selects the search phrase "Hawaiian eruptions." The NLP scan and search process is now performed using the new phrase. In some embodiments, a machine learning module may be communicatively coupled to the contextual search engine for use in selecting and extracting keywords that are both relevant to the selected search term, as well as relevant to knowledge of historical context of the progressive search. In this example a result of this second search is shown in block 30, with text describing eruptions of a specific Hawaiian volcano, Mauna Loa.

Figure 3:
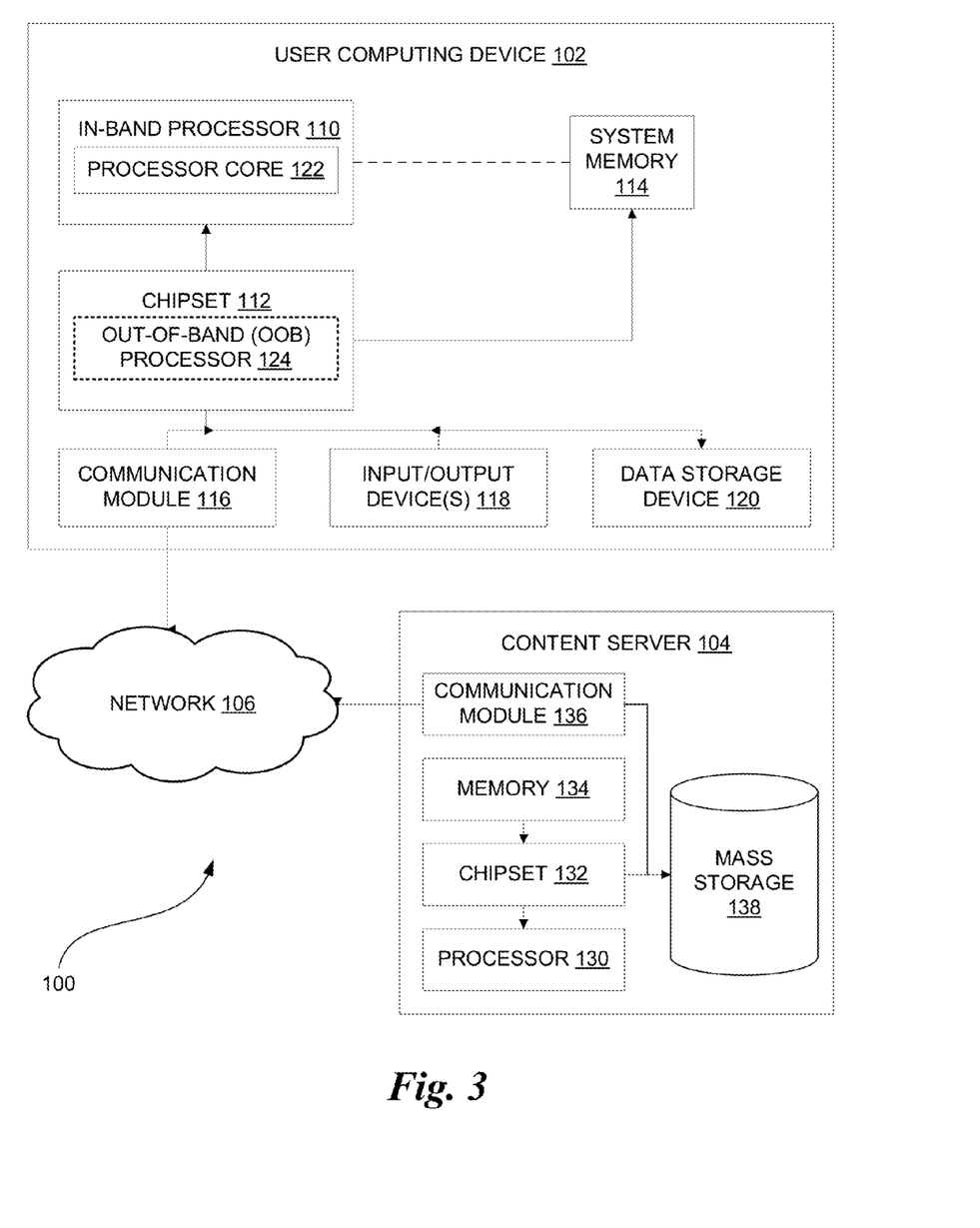
FIG. 3 is a block diagram illustrating an example system on which various embodiments may be implemented.

FIG. 3 is a simplified block diagram illustrating an example system 100 configured to provide a contextual search system, according to an embodiment. Exemplary system 100 includes an electronic user device 102, a content server 104, and a network 106 that communicatively couples the electronic device 102 to the server 104. Although only one electronic device 102, one server 104, and one network 106 are illustratively shown in FIG. 3, the system 100 may include any number of electronic devices 102, servers 104, and networks 106 of similar or dissimilar architecture. For instance, the electronic device 102 may communicate over one or more networks 106 with multiple servers 104, and each server 104 may communicate over one or more networks 106 with multiple electronic devices 102.

The electronic device 102 may be embodied as any type of electronic device capable of performing the functions described herein. By way of example, the electronic device 102 may be embodied as a personal computer (PC), a laptop computer, a handheld computer, an ultra-mobile personal computer, such as, a tablet device, a netbook device, an Ultrabook™ computing device, a hybrid laptop/tablet device, an electronic reader device (ebook), a personal digital assistant (PDA) device, a mobile internet device (MID), a smartphone, a cellular phone, and so forth. In the illustrative embodiment shown in FIG. 3, the electronic device 102 may be implemented using hardware, firmware, software, or a combination thereof.

Exemplary electronic device 102 comprises one or more processors 110, also referred to as host processor or in-band processor. The host processor 110 may comprise one or more processor cores 122. The electronic device 102 further comprises system control logic, or chipset, 112 coupled to the at least one processor 110, system memory 114 coupled to system control logic 112, non-volatile memory and/or storage device(s) 120 coupled to system control logic 112, and one or more communications interfaces or modules 116 coupled to system control logic 112. The system control logic may optionally further comprise a secondary out-of-band processor 124 including its own communication module. System control logic 112 is also coupled to one or more input/output devices 118. It should be appreciated that the electronic device 102 may include other components, sub-components, and devices commonly found in a computer and/or computing device, which are not illustrated in FIG. 3 for clarity of the description.

In one embodiment, one or more processors 110 may be any type of processor capable of executing software/firmware, such as, for example, a microprocessor, digital signal processor, microcontroller, or the like. The one or more processors 110 may be embodied as single core processors having a processor core 122. However, in other embodiments, the one or more processors 110 may be embodied as multi-core processors having multiple processor cores. Additionally, the electronic device 102 may include additional processors having one or more processor cores. The one or more processors 110 is generally responsible for executing a software stack, which may include an operating system and various applications, programs, libraries, and drivers resident on the electronic device 102.

In one embodiment, system control logic 112 may include any suitable interface controllers to provide for any suitable interface to at least one processor 110 and/or to any suitable device or component in communication with system control logic 112.

In one embodiment, system control logic 112 may include one or more memory controllers to provide an interface to system memory 114. System memory 114 may be used to load and store data and/or instructions, for example, for electronic device 102. In one embodiment, system memory 114 may include any suitable volatile memory, such as, for example, suitable dynamic random access memory (DRAM).

In one embodiment, system control logic 112 may include one or more input/output (I/O) controllers to provide an interface to a display device (not shown), display controller (not shown), non-volatile memory and/or storage device(s) 120, and communications interface(s) 116.

In one embodiment, non-volatile memory and/or storage device(s) 120 is a machine accessible medium (also referred to as computer readable medium) which may be used to store data and/or instructions, for example. Non-volatile memory and/or storage device(s) 120 may include any suitable non-volatile memory, such as flash memory for example, and/or may include any suitable non-volatile storage device(s), such as one or more hard disk drives (HDDs), one or more compact disc (CD) drives, and/or one or more digital versatile disc (DVD) drives for example.

Communications interface(s) 116 may provide an interface for electronic device 102 to communicate over one or more networks, such as network 106, with server 104 or any other suitable networked device. Communications interface(s) 116 may include any suitable hardware, firmware, software, or a combination thereof. In one embodiment, communications interface(s) 116 may include, for example, a network adapter, a wireless network adapter, a telephone modem, and/or a wireless modem. In an embodiment for wireless communications, communications interface(s) 116 may use one or more antennas (not shown).

In one embodiment, system control logic 112 may include one or more input/output (I/O) controllers to provide an interface to any suitable input/output device(s) such as, for example, an audio device to help convert sound into corresponding digital signals and/or to help convert digital signals into corresponding sound, a camera, a camcorder, a printer, and/or a scanner (all of which are not shown).

In one embodiment, a display device may be implemented using any suitable display technology, such as, for example, a liquid crystal display (LCD). In one embodiment, a display controller may be coupled to help control input through the display device. In one embodiment, the display controller may be coupled to system control logic 112 for at least one I/O controller and/or at least one processor 110 to process input detected by the display controller through the display device. In an embodiment, system control logic 112 may include one or more graphics controllers to provide one or more display interfaces to the display device. In an embodiment, the display device may be communicatively coupled to the electronic device 102 directly, wirelessly or remotely.

In one embodiment, the display device may be a touch-sensitive display device and display controller may be a touch controller. The touch-sensitive display device may be implemented using any suitable touch-sensitive technology such as, for example and without limitation, capacitive, resistive, surface acoustic wave (SAW), infrared, and optical imaging. In one embodiment, the touch-sensitive display device may be implemented using any suitable multi-touch technology. The touch-sensitive display device may be implemented using any suitable display technology, such as, for example, a liquid crystal display (LCD). The touch controller may be coupled to help control touch input through the touch-sensitive display device. In one embodiment, the touch controller may be coupled to system control logic 112 for at least one I/O controller and/or at least one processor 110 to process touch input detected by the touch controller through the touch-sensitive display device. In an embodiment, system control logic 112 may include one or more graphics controllers to provide one or more display interfaces to the touch-sensitive display device.

In one embodiment, at least one processor 110 may be packaged together with logic for one or more controllers of system control logic 112. In one embodiment, at least one processor 110 may be packaged together with logic for one or more controllers of system control logic 112 to form a System in Package (SiP). In one embodiment, at least one processor 110 may be integrated on the same die with logic for one or more controllers of system control logic 112. In one embodiment, at least one processor 110 may be integrated on the same die with logic for one or more controllers of system control logic 112 to form a System on Chip (SoC).

The content server 104 may be embodied as any type of computing device separate from the electronic device 102. By way of example, the server 104 may be embodied as a personal computer, a workstation, a laptop computer, a handheld computer, a mobile internet device, a cellular phone, a personal data assistant, a telephony device, a network appliance, a virtualization device, a storage controller, or other computer-based devices configured to communicate with the electronic device 102 over the network 106. In the illustrative embodiment shown in FIG. 3, the server 104 includes a processor 130, a chipset 132, a system memory 134, communication module 136, one or more mass storage devices 138, and one or more input/output devices (not shown). In some embodiments, several of the foregoing components may be incorporated on a motherboard of the server 104, while other components may be communicatively coupled to the motherboard via, for example, a peripheral port. Furthermore, it should be appreciated that the server 104 may include other components, sub-components, and devices commonly found in a computer and/or computing device, which are not illustrated in FIG. 3 for clarity of the description.

The components of content server 104 may be similar or dissimilar to the components of user device 102, and may comprise similar or dissimilar alternative components as described above for electronic device 102. For instance, the processor 130 of the server 104 may be any type of processor capable of executing software/firmware, such as a microprocessor, digital signal processor, microcontroller, or the like. The processor 130 is illustratively embodied as a single processor and may have a single processor core. However, in other embodiments, the processor 130 may be embodied as a multi-core processor having multiple processor cores. Additionally, the server 104 may include additional processors 130 having one or more processor cores. The processor 130 is generally responsible for executing a software stack, which may include an operating system and various applications, programs, libraries, and drivers resident on the server 104.

Alternative and equivalent components of content server 104 are not reiterated here, for brevity, but it will be understood that the architecture and configuration of content server 104 may vary as described for electronic device 102.

In an embodiment, electronic device 102 is used to present a media experience to the user. The user may initiate a contextual search on electronic device 102. In an embodiment, the NLP may be performed on the user device to send search parameters and keywords to a search engine residing on one or more content servers 104, via network 106. The network may be the public Internet or a private intranet. In another embodiment, the NLP may be performed on a content server 104 or other remote device (not shown). In an embodiment, a contextual search may be performed locally on the electronic device 102 and omit the use of content server 104 altogether, for instance when searching a local database or localized web pages and other documents. In an embodiment, the context search module may select either local processing or remote processing for the NLP module, based on the processing power of the user device and availability of connections to a remote processor having the NLP module. For instance, the NLP may reside on a user's home desktop computer and the search may be initiated on a smartphone with limited processing power. If the home desktop computer is available via WiFi connection (or via a network such as the Internet), then the context search engine on the smartphone may choose to offload the NLP analysis to the home desktop computer rather than a cloud server or content server or other remote device.

Figure 4:
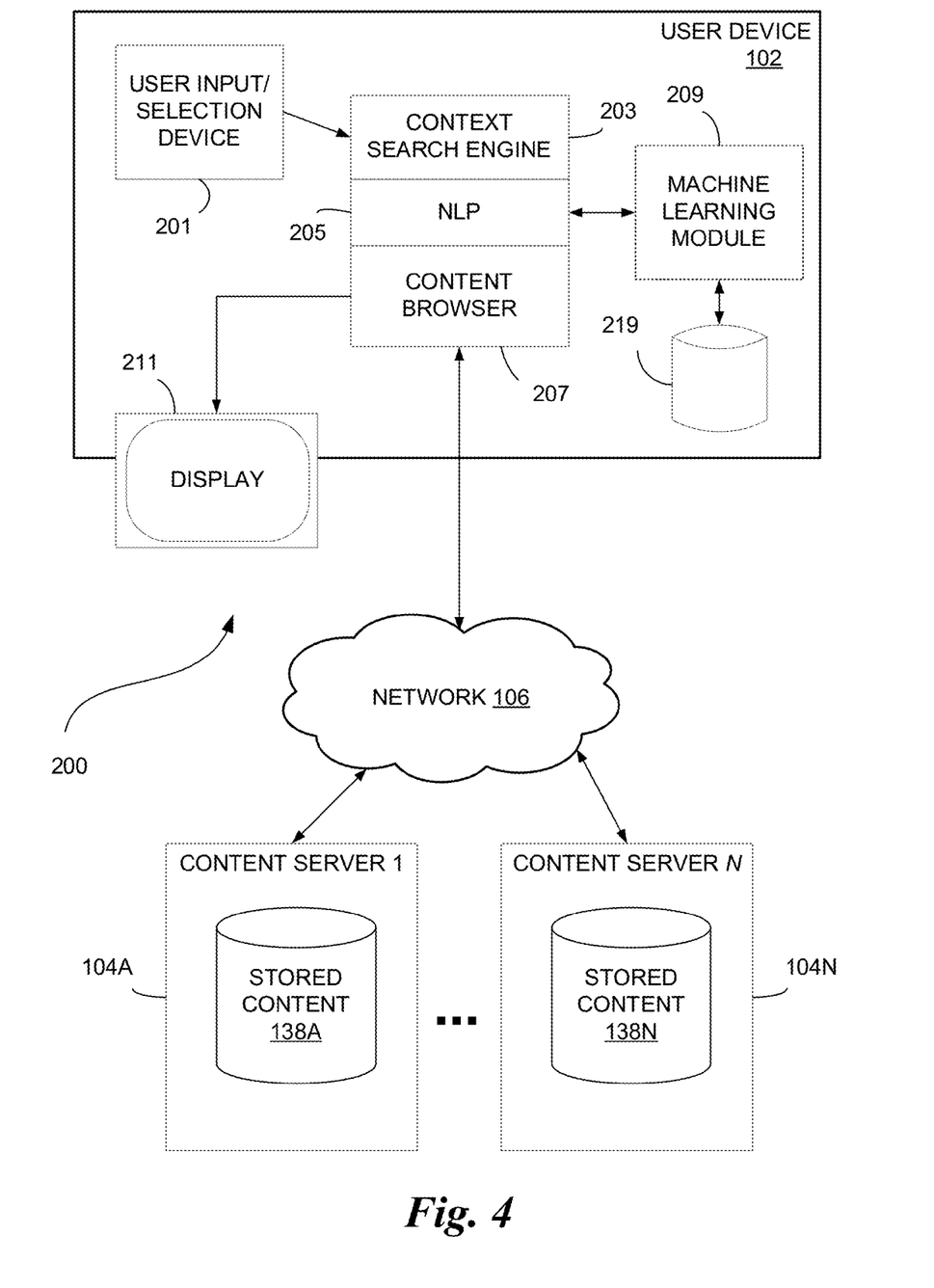
FIG. 4 is a block diagram illustrating structural components and modules of an example context search system, according to an embodiment.

Now referring to FIG. 4, a block diagram illustrating various structural components and modules of an example context search system 200 are shown, according to an embodiment. In an embodiment, electronic device 102 further comprises a user input/selection device 201. The input/selection device may be used by the user to select the desired search term from within the media experience. This input/selection device 201 may vary depending on the architecture and configuration of the device. The user may utilize a mouse, touchpad, touchscreen, or other input device to select the search term. The media experience will be typically displayed on display 211 and/or have an audio component playing through an audio output device (not shown). For an audio only media experience, the user may select search terms audible with pre-defined control words, such as "Start search term" and "end search term." For a contextual search system enabling an audio media experience, additional modules for speech recognition and command and control for audible commands (neither shown) will be coupled to the electronic device 102, as well as an audio input device (not shown).

In an embodiment, the electronic device 102 further comprises a context search engine 203 and natural language processor module 205 in communication with a content browser 207. In another embodiment, the context search engine 203 is further communicatively coupled to a machine learning module 209. The machine learning module 209 is communicatively coupled with memory storage 219 for storing and retrieving historical search and context data.

It will be understood that in various embodiments, the natural language processor (NLP) module 205 and machine learning module 209 may reside on the electronic device 102 or a remote device such as a content server 104, a cloud service or other remote device (not shown). Portions of the modules 205 and 209 may be co-located on the same device or be distributed among one or more devices remote from the electronic device 102.

In an embodiment, the machine learning module 209 learns through repetition and user guidance. The machine learning module may learn through observation of the user, for instance content types or topics of interest. If the user is very visual rather than data driven, the context search engine may send results with more images, videos and graphics rather than links to long textual dissertations. Topics of interest may be inferred through watching the user across multiple forms of media at different times; there may be threads of interest which help guide the search (i.e., history vs. geography vs. sociology of a place of interest). This topics of interest may help prioritize what results to bring forward. Both of these machine learning techniques require time and repetition and/or user interaction with the engine to "teach" it the user's preferences and preferred responses.

In an embodiment, the content browser 207 uses the selected search term and keywords identified by the NLP module and initiates a search. The search may be a local database, web page or document search of data residing on the electronic device 102 or a search via the network 106 where the content is available on one or more content servers 104A-N in stored content 138A-N.

In an embodiment, the search term is sent to at least one additional content browser session. The additional session may be for the same content browser or a different content browser. The results from the multiple browsers may then be aggregated and displayed for the user. In the case of aggregated results, each result may be identified with the content browser used, and/or with the source of the content found. In an embodiment, two tabs for a single content browser, for instance multiple session for the same content browser, may return results that may be aggregated before presentation to the user.

Figure 5:
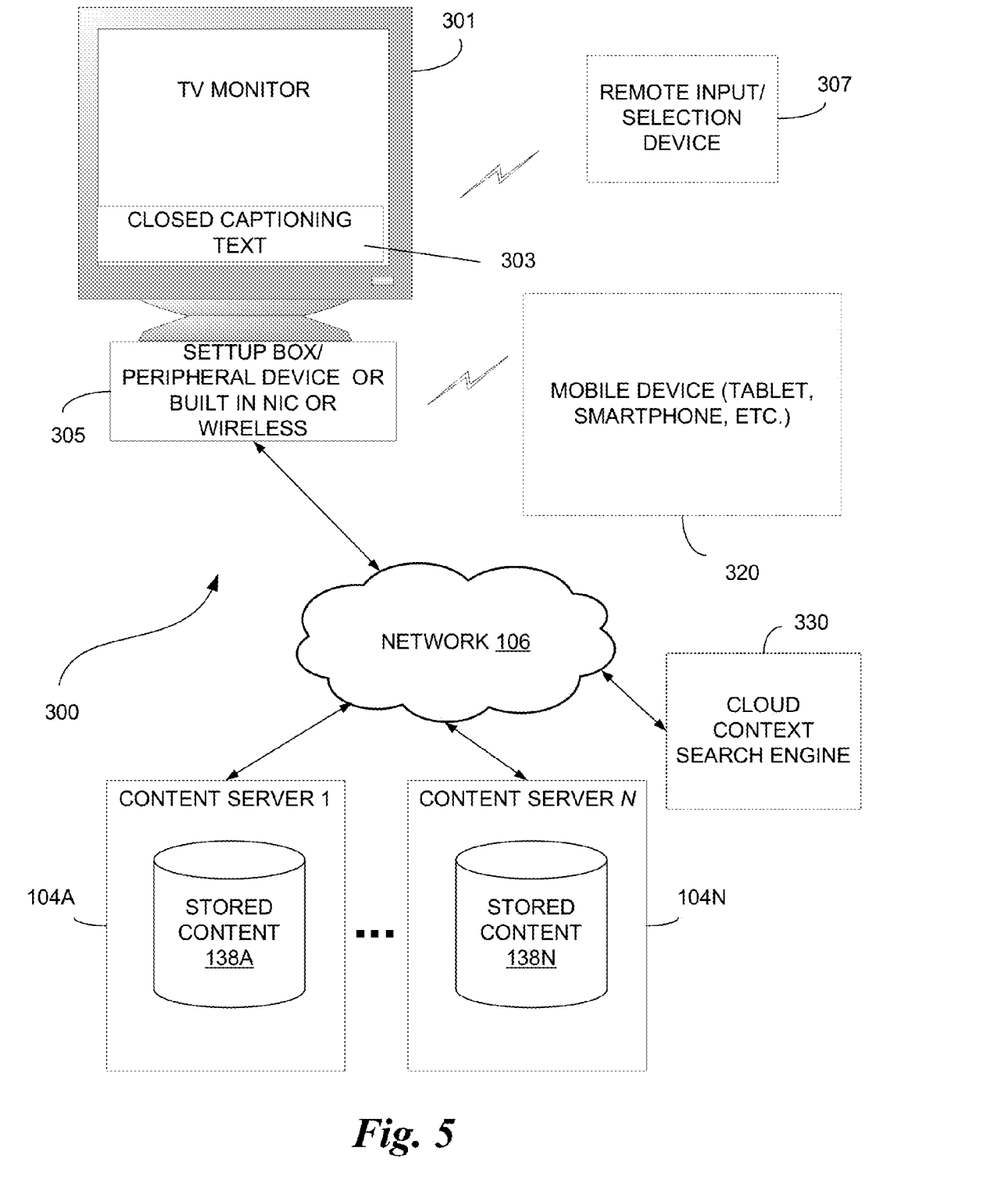
FIG. 5 is a block diagram illustrating an example system on which an embodiment for contextual searching based on a television viewing experience may be implemented.

Referring now to FIG. 5, a block diagram illustrates an example system 300 on which an embodiment for contextual searching based on a television viewing experience may be implemented. In this example, the user experience may be facilitated by a television 301 and at least one of a remote input/selection device 307 (i.e., TV remote control) and/or a mobile device 320, such as, but not limited to, a tablet, laptop, smartphone, or other computing device. In some embodiments, the mobile device 320 may also be used as a remote control for the television, and the remote device 307 is unnecessary. In some embodiments, the user will have only the remote device 307 and not the mobile device 320. The television 301 may be coupled to a settop box, or other peripheral device such as a DVD or Blu-ray player, or other device 305 used to retrieve programming for display on the television. The retrieval device may be connected to a content server 104A-N, such as for receiving on-demand Internet streaming media, for instance, available from Netflix, Inc., or a headend facility (not shown) for receiving cable and broadcast television programming. The retrieval device may communicate with the content server, headend, or other content provider via wired or wireless communication. In an embodiment, the television is coupled with a WiFi communication device and may communicate through a network 106 without additional device 305, or in some cases, a retrieval device 305 is integrated with the television 301.

In an embodiment, closed captioning text 303 may be used as the data stream from which the desired search term may be selected. The user may select the search term via the remote control 307 or mobile device 320, in various embodiments. In an embodiment, the closed captioning text 303 appears on the television monitor and the user presses a control key or sequence of control keys on the remote control 307 to grab or select the appropriate text. The selection operation may temporarily stop the text from scrolling to facilitate the selection. In some embodiments text to be used for context scanning may be limited to the amount shown on the screen. In another embodiment, there may be additional text accessible that surrounds the visible text to provide additional context. In an embodiment, the closed captioning text may be stored locally on the television, on the settop box, or retrieved from a source device (DVD, Blu-ray, content server, etc.).

In another embodiment, the search term may be selected using the mobile device 320, either as an alternate remote control, or as a secondary device that is synchronized with the programming, closed captioning, or media being viewed on the television. Closed captioning of the programming may be synchronized from a cloud server (104 or 330), a connection to the settop box 305 or television 301 and a local client or direct from the settop box 305 or television 301 and mobile device 320.

In an embodiment, the user selects the text using a remote control 307. A context search engine and NLP module perform the analysis and identification of contextual parameters as described for FIG. 1. The context search engine may reside locally on the television (e.g., for a smart TV), settop box, other connected processing device or remotely over the network 106 as a cloud service or other remote service, for instance, on content server 104. In an embodiment where the user has a mobile device 320 in communication with the television (e.g., synchronized to the programming), some or all of the context search engine 203, NLP module 205, and optional machine learning module 209 may reside on the mobile device 320 or be distributed among one or more of the television 301, mobile device 320, content servers 104A-N, cloud server 330, and/or retrieval device 305. In an embodiment, once the contextual search parameters have been identified by the NLP 205, they are passed to a content browser 207 which may reside on any of the television 301, retrieval device 305, cloud server 330 or mobile device 320.

In an embodiment, initiating controls for a contextual search will automatically turn on closed captioning if it had been previously turned off. In an embodiment, the closed captioning text may appear on the mobile device 320, but not on the television display.

Results from the search may be provided on the television 301, or when available, the mobile device 320. Results may be displayed on the television 301 in a variety of formats, for instance, including but not limited to, a picture in picture area, a split screen, or completely or partially obscure the current programming with the search results. In an embodiment where the television is coupled to a digital video recorder (DVR) such as available from most commercial cable and satellite television providers, or such as the TiVo® device, current programming may be automatically set to record while the search results are displayed so that the user does not miss any of the current programming, and may return to their media experience at a later time.

In an embodiment, the mobile device may actually be a more stationary device such as a desktop computer which may be communicatively coupled to the system by either a wired or wireless connection, or directly coupled to the television 301 or retrieval device 305.

ADDITIONAL NOTES AND EXAMPLES

Example 1 can include subject matter (such as a system configured to perform a contextual search, or a system configured to perform a method providing a contextual search, means for performing acts, or a machine readable medium including instructions that when performed by a machine cause the machine to perform acts related to a contextual search, etc.), where a system for providing a contextual based search, comprises a computing device configured to provide a media experience to a user, the computing device further comprising: an output display; an input device for selecting a search term within the media experience; a context search engine communicatively coupled to a natural language processor module and a content browser, wherein the context search engine is configured to provide the search term to the natural language processor, and provide keyword results received from the natural language processor to the content browser.

Example 2 includes the subject matter of Example 1 and further includes wherein the natural language processor module resides on at least one of the computing device, a content server, a cloud server, a remote server and a local computing device, wherein when the natural language processor module does not reside on the computing device, the natural language processor may be accessed via at least one of a direct connection, a wired connection and a wireless connection.

Example 3 includes the subject matter of either of Examples 1 and 2, and wherein the natural language processor module is configured to use proximity based statistical analysis in identifying the keyword results to be provided to the context search engine.

Example 4 includes the subject matter of Example 3, and wherein the natural language processor module is configured to perform the proximity based statistical analysis on a portion of text within the media experience, wherein the portion of text is within a specified proximity of the search term.

Example 5 includes the subject matter of any of the foregoing Examples 1-4, further comprising a machine learning module communicatively coupled to the natural language processor module. Optionally, the natural language processor module is configured to perform a proximity based statistical analysis on a portion of text within the media experience, wherein the portion of text is within a specified proximity of the search term, and wherein the machine learning module is configured to dynamically adjust the size of the data portion based on historical contextual information.

Example 6 may include the subject matter of any of the foregoing Examples 1-5, including or omitting optional elements, and further wherein the computing device is further configured to display results returned from the content browser, wherein the content browser is configured to perform searches using the provided keywords.

Example 7 may include the subject matter of any of the foregoing Examples 1-6, including or omitting optional elements, and further wherein the context search engine is configured to provide the search term to at least one additional content browser session and aggregate results from the content browser and the at least one additional content browser session and display the aggregated results to the user.

Example 8 is a system for providing a contextual based search, comprising: a context search engine communicatively coupled to a natural language processor module and at least one content browser, wherein the context search engine is configured to provide a user selected search term to the natural language processor, and provide keyword results received from the natural language processor to the at least one content browser. The selected search term may be optionally selected from closed captioning text of a one of a television program, broadcast program, streaming media and recorded media.

Example 9 may include the subject matter of Example 8, and when the selected search term is selected from close captioning test, the search term is to be selected using one of a remote control device and a secondary computing device.

Example 10 may include the subject matter of any of the foregoing Examples 8-9, including or omitting optional elements, and further wherein the natural language processor module is configured to use proximity based statistical analysis in identifying the keyword results to be provided to the context search engine.

Example 11 may include the subject matter of Example 10, including or omitting optional elements, and further wherein the natural language processor module is configured to perform the proximity based statistical analysis on a portion of text within an available portion of the closed captioning text, wherein the portion of text is within a specified proximity of the search term.

Example 12 may include the subject matter of any of the foregoing Examples 8-11, including or omitting optional elements, and further comprising a machine learning module communicatively coupled to the natural language processor module, wherein the natural language processor module is configured to perform a proximity based statistical analysis on a portion of text within a specified proximity of the search term, and wherein the machine learning module is configured to dynamically adjust the size of the text portion based on historical contextual information.

Example 13 may include the subject matter of any of the foregoing Examples 8-12, including or omitting optional elements, and further wherein the context search engine is configured to provide results from the content browser for display on at least one of the television and the secondary device.

Example 14 is a method for contextual search, comprising: responsive to user selection of a search term within a media experience, sending the search term by a context search engine to a natural language processor module; scanning content within proximity of the search term by the natural language processor module, and determining keywords associated with the search term; and providing the keywords to at least one content browser for search.

Example 15 may include the subject matter Example 14, and further comprising: displaying results of the search by the at least one content browser to the user.

Example 16 may include the subject matter of any of the foregoing Examples 14-15, including or omitting optional elements, and further wherein the search term is selected from one of an electronic document accessible to a user device and closed captioning text corresponding to one of a television program, broadcast program, streaming media and recorded media available on a viewing device.

Example 17 may include the subject matter of any of the foregoing Examples 14-16, including or omitting optional elements, and further wherein results of the search are displayed on one of a user device and a secondary user device.

Example 18 may include the subject matter of any of the foregoing Examples 14-17, including or omitting optional elements, and further comprising: identifying the keywords to be provided to the context search engine by the natural language processor module, wherein the identifying uses proximity based statistical analysis. The proximity based statistical analysis may optionally be performed on a portion of text within the media experience, wherein the portion of text is within a specified proximity of the search term, and optionally, dynamically adjusting the size of the data portion, by a machine learning module, wherein the adjusting is based on historical contextual information.

Example 19 may include the subject matter of any of the foregoing Examples 14-18, including or omitting optional elements, and further comprising: performing a proximity based statistical analysis on a portion of text within the media experience, wherein the portion of text is within a specified proximity of the search term; and dynamically adjusting the size of the data portion, by a machine learning module, wherein the adjusting is based on historical contextual information.

Example 20 may include the subject matter of any of the foregoing Examples 14-19, including or omitting optional elements, and further comprising: providing the search term to at least one additional content browser session and aggregating results from the content browser and the at least one additional content browser session; and displaying the aggregated results to the user.

Example 21 is at least one computer readable medium or machine accessible medium having instructions stored thereon, that when the instructions are executed on a machine, will cause the machine to perform any of the methods described in Examples 14-20, either including or omitting the optional features.

Example 22 is an apparatus for contextual search configured with means to perform any of the steps described in Examples 14-20, either including or omitting the optional features.

Example 23 is an apparatus for contextual search configured to perform the method as described in Examples 14-20, either including or omitting the optional features.

Example 24 is an apparatus for contextual search, comprising: responsive to user selection of a search term within a media experience, means for identifying the search term in a media experience; means for scanning content within proximity of the search term, and determining keywords associated with the search term; and means for providing the keywords to at least one content browser for search.

Example 25 may include the subject matter of Examples 24, and further comprising: means for displaying results of the search to the user.

Example 26 may include the subject matter of any of Examples 24-25 including or omitting optional elements, wherein the search term is selected from one of an electronic document accessible to a user device and closed captioning text corresponding to one of a television program, broadcast program, streaming media and recorded media available on a viewing device.

Example 27 may include the subject matter of any of Examples 24-26, including or omitting optional elements, wherein results of the search are displayed on one of a user device and a secondary user device.

Example 28 may include the subject matter of any of Examples 24-27, including or omitting optional elements, wherein the means for identifying the search term in a media experience utilizes a proximity based statistical analysis. Optionally, Example 28 may include means for performing the proximity based statistical analysis on a portion of text within the media experience, wherein the portion of text is within a specified proximity of the search term.

Example 29 may include the subject matter of any of Examples 24-28, including or omitting optional elements, further comprising: means for performing a proximity based statistical analysis on a portion of text within the media experience, wherein the portion of text is within a specified proximity of the search term; and means for dynamically adjusting the size of the data portion, wherein the adjusting is based on historical contextual information.

Example 30 may include the subject matter of any of Examples 24-29, including or omitting optional elements, further comprising: means for providing the search term to at least one additional content browser session and aggregating results from the content browser and the at least one additional content browser session; and means for displaying the aggregated results to the user.

The techniques described herein are not limited to any particular hardware or software configuration; they may find applicability in any computing, consumer electronics, or processing environment. The techniques may be implemented in hardware, software, firmware or a combination.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For simulations, program code may represent hardware using a hardware description language or another functional description language which essentially provides a model of how designed hardware is expected to perform. Program code may be assembly or machine language, or data that may be compiled in advance or during execution and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible, also referred to as computer readable, medium having stored thereon instructions that may be used to program a processing system or other electronic device to perform the methods. While a machine-accessible medium may be illustrated as a single medium, the terms "machine accessible medium," or "computer readable medium" may include a single medium or multiple media (e.g., a centralized or distributed database, and/or associated caches and servers) that configured to store the one or more instructions. Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine accessible medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, tablets, laptops, desktop computers or hybrids, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud services, or ad hoc peer to peer networks where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

While the subject matter herein has been described with reference to illustrative embodiments and examples, this description is not intended to be construed in a limiting sense. Various modifications of the illustrative embodiments, as well as other embodiments which are apparent to persons skilled in the art are deemed to lie within the scope of the appended claims.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the claimed subject matter be determined with reference to the appended claims, along with the full scope of equivalents to which such claims are entitled.

What is claimed is:

1. A system for providing a contextual based search, comprising:
   a computing device configured to provide a media experience to a user, the computing device further comprising:
      an output display;
      an input device for selecting a search term within the media experience; and
      a context search engine communicatively coupled to a natural language processor module and a content browser, wherein the context search engine is configured to provide the search term to the natural language processor, and provide keyword results received from the natural language processor to the content browser;
   wherein the keyword results are provided to the user as one or more of videos, images, or graphics based on a first historical preference of the user, and as a textual reference based on a second historical preference of the user, and
   wherein topics of interest to the user are to be determined based on historical use of multiple forms of media by the user over a predetermined period of time, and the topics of interest are to be used to prioritize the keyword results.

2. The system recited in claim 1, wherein the natural language processor module resides on at least one of the computing device, a content server, a cloud server, a remote server and a local computing device, wherein when the natural language processor module does not reside on the computing device, the natural language processor may be accessed via at least one of a direct connection, a wired connection and a wireless connection.

3. The system as recited in claim 1, wherein the natural language processor module is configured to use proximity based statistical analysis in identifying the keyword results to be provided to the context search engine.

4. The system as recited in claim 3, wherein the natural language processor module is configured to perform the proximity based statistical analysis on a portion of text within the media experience, wherein the portion of text is within a specified proximity of the search term.

5. The system as recited in claim 1, further comprising a machine learning module communicatively coupled to the natural language processor module.

6. The system recited in claim 5, wherein the natural language processor module is configured to perform a proximity based statistical analysis on a portion of text within the media experience, wherein the portion of text is within a specified proximity of the search term, and wherein the machine learning module is configured to dynamically adjust the size of the data portion based on historical contextual information.

7. The system as recited in claim 1, wherein the computing device is further configured to display results returned from the content browser, wherein the content browser is configured to perform searches using the provided keywords.

8. The system as recited in claim 7, wherein the context search engine is configured to provide the search term to at least one additional content browser and aggregate results from the content browser and the at least one additional content browser and display the results to the user.

9. A system for providing a contextual based search, comprising:
a context search engine communicatively coupled to a natural language processor module and at least one content browser, wherein the context search engine is configured to provide a user selected search term to the natural language processor, and provide keyword results received from the natural language processor to the content browser;
wherein the keyword results are provided to the user as one or more of videos, images, or graphics based on a first historical preference of the user, and as a textual reference based on a second historical preference of the user, and
wherein topics of interest to the user are to be determined based on historical use of multiple forms of media by the user over a predetermined period of time, and the topics of interest are to be used to prioritize the keyword results.

10. The system as recited in claim 9, wherein the selected search term is to be selected from closed captioning text of one of a television program, broadcast program, streaming media and recorded media.

11. The system as recited in claim 10, wherein the closed captioning text is to be selected using one of a remote control device and a secondary computing device.

12. The system as recited in claim 11, wherein the context search engine is configured to provide results from the content browser for display on at least one of the television and the secondary device.

13. The system as recited in claim 10, wherein the natural language processor module is configured to use proximity based statistical analysis in identifying the keyword results to be provided to the context search engine.

14. The system as recited in claim 13, wherein the natural language processor module is configured to perform the proximity based statistical analysis on a portion of text within an available portion of the closed captioning text, wherein the portion of text is within a specified proximity of the search term.

15. The system as recited in claim 9, further comprising a machine learning module communicatively coupled to the natural language processor module, wherein the natural language processor module is configured to perform a proximity based statistical analysis on a portion of text within a specified proximity of the search term, and wherein the machine learning module is configured to dynamically adjust the size of the text portion based on historical contextual information.

16. At least one non-transitory computer readable storage medium having embodied thereon instructions which when executed on a machine cause the machine to:
responsive to user selection of a search term within a media experience, send the search term by a context search engine to a natural language processor module;
scan content within proximity of the search term by the natural language processor module, and determine keywords associated with the search term; and
provide the keywords to at least one content browser for search;
wherein keyword results are provided to a user as one or more of videos, images, or graphics based on a first historical preference of the user, and as a textual reference based on a second historical preference of the user, and
wherein topics of interest to the user are to be determined based on historical use of multiple forms of media by the user over a predetermined period of time, and the topics of interest are to be used to prioritize the keyword results.

17. The medium as recited in claim 16, further comprising instructions to:
display results of the search by the at least one content browser to the user.

18. The medium as recited in claim 17, wherein the search term is selected from one of an electronic document accessible to a user device and closed captioning text corresponding to one of a television program, broadcast program, streaming media and recorded media available on a viewing device.

19. The medium as recited in claim 18, wherein results of the search are displayed on one of a user device and a secondary user device.

20. The medium as recited as in claim 16, further comprising instructions to:
identify the keywords to be provided to the context search engine by the natural language processor module, wherein the identifying uses proximity based statistical analysis.

21. The medium as recited in claim 20, further comprising instructions to:
perform the proximity based statistical analysis on a portion of text within the media experience, wherein the portion of text is within a specified proximity of the search term.

22. The medium as recited in claim 16, further comprising instructions to:
perform a proximity based statistical analysis on a portion of text within the media experience, wherein the portion of text is within a specified proximity of the search term; and dynamically adjust the size of the data portion, by a machine learning module, wherein the adjusting is based on historical contextual information.

23. The medium as recited in claim 22, further comprising instructions to:
provide the search term to at least one additional content browser session and aggregate results from the content browser and the at least one additional content browser session; and
display the aggregated results to the user.

* * * * *